Patented Nov. 24, 1931

1,833,290

UNITED STATES PATENT OFFICE

GEORG KALISCHER, OF FRANKFORT-ON-THE-MAIN, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

NEW INTERMEDIATES AND PROCESS OF MAKING SAME

No Drawing. Original application filed July 8, 1926, Serial No. 121,283, and in Germany July 20, 1925. Divided and this application filed January 31, 1928. Serial No. 250,951.

This application is a division of our application Serial No. 121,283, filed July 8, 1926.

We have found that new and valuable intermediate products are obtainable by treating a compound of the general formula:

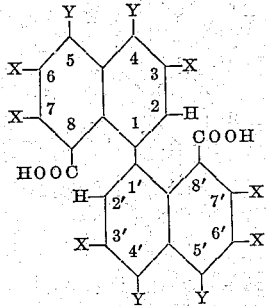

(wherein the X's stand for hydrogen atoms, of which one or more may be replaced by a monovalent substituent, the Y's stand for hydrogen atoms, which may be replaced by halogen), with an acid condensing agent at moderate conditions, until the reaction product is soluble in glacial acetic acid.

Our new compounds correspond most probably to the following general formula:

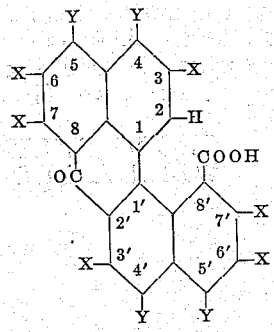

(wherein the X's stand for hydrogen atoms, of which one or more may be replaced by a monovalent substituent and the Y's stand for hydrogen atoms, which may be replaced by halogens).

1.1'-dinaphthyl-8.8'-dicarboxylic acid is obtainable for instance by saponifying its diethylic ester, which Kalb (see Berichte der deutschen Chemischen Gessellschaft, vol. 47, page 1724) has prepared by treating 1-chloro-8-naphthoic esters with copper powder.

The nuclear substitution products of 1.1'-dinaphthyl-8.8'-dicarboxylic acid may be obtained either by saponifying the corresponding esters, which are described in the German Patent No. 280787, for instance by heating them with alcoholic hydrochloric acid or alcoholic alkalies, or by introducing a substituent into the nucleus of 1.1'-dinaphthyl-8.8'-dicarboxylic acid itself. It yields, when brominated in glacial acetic acid, a monobromo-product, crystallizing from trichlorobenzene in yellow crystals and melting above 300° C., when treated with an excess of bromine in the cold an orange colored dibromocompound, melting above 300° C. and soluble in sulfuric acid of 80 per cent strength to an olive solution while the solution of the monobromoproduct is orange colored.

In order to further illustrate our invention the following examples are given; we wish it however to be understood, that our invention is not limited to the particular examples given nor to the specific conditions mentioned. The parts are by weight and all temperatures in centigrades.

Example 1

10 parts of 1.1'-dinaphthyl-8.8'-dicarboxylic acid are boiled under a reflux condenser while stirring with 200 parts of glacial acetic acid and 20 parts of anhydrous zinc chloride, until the starting material is dissolved. After diluting the solution with water the benzo-benzanthrone-carboxylic acid, thus formed, separates.

The new compound crystallizes from a mixture of glacial acetic acid and alcohol in yellow prisms, melting at 278°. It is easily soluble in alkalies with a yellow color and in cold concentrated sulfuric acid with a brownish red color quickly changing to green.

*Example 2*

Into a suspension of 10 parts of 1.1′-dinaphthyl-8.8′-dicarboxylic acid in 48 parts of sulfuric acid of 48 per cent strength 230 parts of sulfuric acid of 66° Bé. are allowed to run while stirring at about 60°. After some time the mass is worked up by introducing it in water, as described in Example 1. The benzobenzanthrone-carboxylic acid, thus formed, may be purified by dissolving it in alkalies, filtering the solution and precipitating with acids.

Analogous products are obtainable by subjecting derivatives and substitution products of 1.1′-dinaphthyl-8.8′-dicarboxylic acid to the same process.

For instance by starting from a mono-bromo-1.1′-dinaphthyl-8.8′-dicarboxylic acid the corresponding monobromobenzobenzanthrone-carboxylic acid is obtained, crystallizing from trichlorobenzene in yellowish orange needles, melting at 288-290°. It is soluble in sulfuric acid of 80 per cent strength with a red color quickly changing to green.

The dibromo-dinaphthyl-dicarboxylic acid yields, when treated in an analogous manner, a dibromobenzobenzanthrone-carboxylic acid, crystallizing from trichlorobenzene in orange colored crystals, melting above 300° and difficultly soluble in cold sulfuric acid of 80 per cent strength with an olive color quickly changing to green.

The monochloro-dinaphthyldicarboxylic acid forms a monochloro-benzobenzanthrone-carboxylic acid, melting at 268-269° when crystallized from monochlorobenzene, corresponding in its properties to the monobromocompound.

We claim:

1. As new products benzo-benzanthrone-carboxylic acids, having probably the general formula:

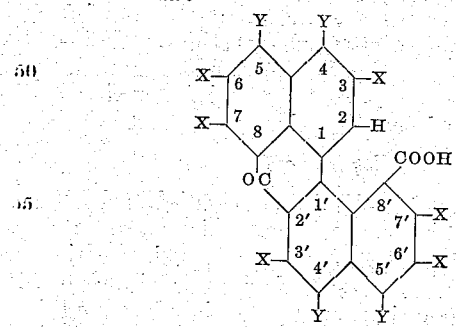

wherein the X's stand for hydrogen atoms, of which one or more may be replaced by a monovalent substituent, the Y's stand for hydrogen atoms, which may be replaced by halogens, which are when dry yellowish to orange powders, insoluble in water, soluble in alkalies to a yellow to brown solution, in sulfuric acid of about 80 per cent strength to an orange to brown solution quickly changing to green.

2. As a new product of benzo-benzanthrone-carboxylic acid of the probable formula:

which is when dry a yellow powder, crystallizing in yellow prisms soluble in alkalies to a yellow, in concentrated sulfuric acid to a brownish red solution quickly changing to green.

3. The process which comprises treating a compound of the general formula:

wherein the X's stand for hydrogen atoms of which one or more may be replaced by a monovalent substituent and the Y's stand for hydrogen atoms which may be replaced by halogen, with zinc chloride in boiling glacial acetic acid solution until the reaction product is soluble in glacial acetic acid.

4. The process which comprises heating about 10 parts of 1.1′-dinaphthyl-8.8′-dicarboxylic acid with about 20 parts of anhydrous zinc chloride and about 200 parts of glacial acetic acid until the starting material is dissolved and isolating the benzo-benzanthrone-carboxylic acid thus formed.

In testimony whereof, we affix our signatures.

GEORG KALISCHER.
WERNER ZERWECK.